United States Patent
Briffaud et al.

(10) Patent No.: US 10,344,126 B2
(45) Date of Patent: Jul. 9, 2019

(54) METHOD FOR MANUFACTURING A THERMOPLASTIC MATERIAL MADE FROM SEMI-CRYSTALLINE POLYAMIDE

(71) Applicant: ARKEMA FRANCE, Colombes (FR)

(72) Inventors: Thierry Briffaud, Caorches Saint Nicolas (FR); Gilles Hochstetter, L'hay Les Roses (FR); Mathieu Capelot, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/304,563

(22) PCT Filed: Apr. 14, 2015

(86) PCT No.: PCT/FR2015/050996
§ 371 (c)(1),
(2) Date: Oct. 17, 2016

(87) PCT Pub. No.: WO2015/159014
PCT Pub. Date: Oct. 22, 2015

(65) Prior Publication Data
US 2017/0044317 A1    Feb. 16, 2017

(30) Foreign Application Priority Data
Apr. 15, 2014  (FR) .................................. 14 53347

(51) Int. Cl.
*C08G 69/26*     (2006.01)
*C08L 77/06*     (2006.01)
*C08L 77/12*     (2006.01)
*B29C 45/00*     (2006.01)
*B29C 67/24*     (2006.01)
*B29C 48/92*     (2019.01)
*B29C 48/02*     (2019.01)
*B29C 48/40*     (2019.01)
*B29K 77/00*     (2006.01)
*B29K 105/00*    (2006.01)
*B29C 48/00*     (2019.01)

(52) U.S. Cl.
CPC ........ *C08G 69/265* (2013.01); *B29C 45/0001* (2013.01); *B29C 48/02* (2019.02); *B29C 48/40* (2019.02); *B29C 48/92* (2019.02); *B29C 67/246* (2013.01); *C08L 77/06* (2013.01); *C08L 77/12* (2013.01); *B29C 48/022* (2019.02); *B29C 2948/926* (2019.02); *B29C 2948/92514* (2019.02); *B29C 2948/92695* (2019.02); *B29C 2948/92704* (2019.02); *B29K 2077/00* (2013.01); *B29K 2105/0002* (2013.01); *B29K 2105/0005* (2013.01); *B29K 2995/004* (2013.01)

(58) Field of Classification Search
CPC .... C08G 81/028; C08G 69/265; C08G 69/36; C08L 77/06; C09J 177/06
See application file for complete search history.

(56) References Cited

U.S. PATENT DOCUMENTS

| | | | |
|---|---|---|---|
| 3,696,074 A | 10/1972 | Tsuda et al. | |
| 4,927,583 A | 5/1990 | Lottiau et al. | |
| 5,047,263 A | 9/1991 | Glemet | |
| 5,138,021 A | 8/1992 | Judas et al. | |
| 5,422,418 A | 6/1995 | Maj et al. | |
| 5,665,855 A | 9/1997 | Acevedo et al. | |
| 6,130,312 A * | 10/2000 | Murakami ........... | C08G 69/265 528/335 |
| 2008/0020219 A1 | 1/2008 | Bouquerel et al. | |
| 2008/0274355 A1 * | 11/2008 | Hewel .................. | C08G 69/265 428/402 |
| 2011/0052848 A1 | 3/2011 | Doshi et al. | |
| 2011/0123749 A1 | 5/2011 | Hewel et al. | |
| 2011/0241249 A1 | 10/2011 | Orange et al. | |
| 2011/0306718 A1 | 12/2011 | Scherzer et al. | |
| 2012/0095161 A1 | 4/2012 | Pawlik et al. | |
| 2012/0202896 A1 | 8/2012 | Blondel et al. | |
| 2012/0321829 A1 | 12/2012 | Bayer et al. | |
| 2013/0131269 A1 | 5/2013 | Davezac et al. | |
| 2013/0225770 A1 | 8/2013 | Jang et al. | |
| 2013/0338260 A1 | 12/2013 | Center et al. | |
| 2013/0338261 A1 | 12/2013 | Center et al. | |
| 2014/0194570 A1 | 7/2014 | Kato et al. | |

(Continued)

FOREIGN PATENT DOCUMENTS

CN  102 234 373 A   11/2011
EP   0 201 367 A1   11/1986

(Continued)

OTHER PUBLICATIONS

U.S. Appl. No. 15/304,575, Thierry Briffaud, Giles Hochstetter and Mathieu Capelot, filed Oct. 17, 2016 (Cited herein as U.S. Appl No. 2017/0037204 A1, filed Feb. 9, 2017).
U.S. Appl. No. 15/304,589, Thierry Briffaud, Gilles Hochstetter and Mathieu Capelot, filed Oct. 17, 2016 (Cited herein as U.S. Appl. No. 2017/0037185 A1, filed Feb. 9, 2017).
U.S. Appl. No. 15/304,620, Gilles Hochstetter, Thierry Briffaud and Mathieu Capelot, filed Oct. 17, 2016 (Cited herein as U.S. Appl. No. 2017/0037186 A1, filed Feb. 9, 2017).
U.S. Appl. No. 15/304,657, Gilles Hochstetter, Thierry Briffaud and Mathieu Capelot, filed Oct. 17, 2016 (Cited herein as U.S. Appl. No. 2017/0037208, filed Feb. 9, 2017).
U.S. Appl. No. 15/304,676 Gilles Hochstetter, Thierry Briffaud and Mathieu Capelot, filed Oct. 17, 2016 (Cited herein as U.S. Appl. No. 2017/0037199, filed Feb. 9, 2017)

(Continued)

*Primary Examiner* — Gregory Listvoyb
(74) *Attorney, Agent, or Firm* — Buchanan Ingersoll & Rooney P.C.

(57) ABSTRACT

The invention relates to a method for manufacturing a thermoplastic material, in particular a mechanical part made from said material, characterized in that it includes at least one step of injection molding a polyamide composition for a thermoplastic material or a composition of a thermoplastic material, or a step implemented by extrusion of same, said material including a thermoplastic matrix made from at least one thermoplastic polymer.

23 Claims, No Drawings

(56) References Cited

U.S. PATENT DOCUMENTS

| | | |
|---|---|---|
| 2014/0316063 A1 | 10/2014 | Hochstetter et al. |
| 2015/0126646 A1 | 5/2015 | Hochstetter et al. |
| 2015/0258742 A1 | 9/2015 | Hochstetter et al. |
| 2015/0267050 A1 | 9/2015 | Briffaud et al. |
| 2017/0037185 A1 | 2/2017 | Briffaud et al. |
| 2017/0037186 A1 | 2/2017 | Hochstetter et al. |
| 2017/0037199 A1 | 2/2017 | Hochstetter et al. |
| 2017/0037204 A1 | 2/2017 | Briffaud et al. |
| 2017/0037208 A1 | 2/2017 | Hochstetter et al. |

FOREIGN PATENT DOCUMENTS

| | | |
|---|---|---|
| EP | 0 261 020 A1 | 3/1988 |
| EP | 0 425 341 A1 | 5/1991 |
| EP | 0 471 566 A1 | 2/1992 |
| EP | 0 550 314 A1 | 7/1993 |
| EP | 0 581 641 A1 | 2/1994 |
| EP | 0 739 924 A1 | 10/1996 |
| EP | 1 266 930 A1 | 12/2002 |
| EP | 1 988 113 A1 | 11/2008 |
| EP | 2 325 260 A1 | 5/2011 |
| EP | 2 386 397 A1 | 11/2011 |
| EP | 2 535 365 A1 | 12/2012 |
| EP | 2 586 585 A1 | 5/2013 |
| FR | 2 603 891 A1 | 3/1988 |
| FR | 2 936 441 A1 | 4/2010 |
| FR | 2 958 296 A1 | 10/2011 |
| FR | 2 997 036 A1 | 4/2014 |
| FR | 2 997 089 A1 | 4/2014 |
| KR | 2008 0032357 A | 4/2008 |
| WO | WO 2005/061209 A1 | 7/2005 |
| WO | WO 2011/003973 A2 | 1/2011 |
| WO | WO 2011/015790 A2 | 2/2011 |
| WO | WO 2013/024593 A1 | 2/2013 |
| WO | WO 2013/060976 A1 | 5/2013 |
| WO | WO 2013/178955 A1 | 12/2013 |

OTHER PUBLICATIONS

Kroschwitz, Jacqueline I., Executive Editor, "Cycloaliphatic Amines", Kirk-Othmer Encyclopedia of Chemical Technology, $4^{th}$ Edition, 1992, pp. 386-405, vol. 2, John Wiley & Sons, Inc., New York, USA (24 pages).

Chengxiang, Lu, et al., "Chemical Modification of Polyamide-6 by Chain Extension with 2,2'-Bis(2-oxazoline)," Journal of Polymer Science, Part B: Polymer Physics, Jan. 1, 2007, pp. 1976-1982, vol. 45, No. 15, Taylor & Francis Group, LLC, XP055163146.

International Search Report (PCT/ISA/210) dated Jul. 3, 2015, by the European Patent Office as the International Searching Authority for International Application No. PCT/FR2015/050996.

Written Opinion (PCT/ISA/237) dated Jul. 3, 2015, by the European Patent Office as the International Searching Authority for International Application No. PCT/FR2015/050996.

J.G. Dolden, "Structure-property relationships in amorphous polyamides," Polymer, Oct. 1976, pp. 875-892, vol. 17, Elsevier Science Publishers B.V., Great Britain.

Chengxiang Lu et al., "Chain Extension of Polyamide 6 Using Bisoxazoline Coupling Agents," Journal of Macromolecular Science, Part B: Physics, Jan. 2008, pp. 986-999, vol. 47, Taylor & Francis Group, LLC.

Notice of Reasons for Rejection, dated Oct. 2, 2018 in JP 2016-562836, Japanese Intellectual Property Office, JP, 14 pages with English-language translation.

\* cited by examiner

METHOD FOR MANUFACTURING A THERMOPLASTIC MATERIAL MADE FROM SEMI-CRYSTALLINE POLYAMIDE

The invention relates to a process for the manufacture of a thermoplastic material comprising at least one stage of molding by injection or comprising a stage of processing by extrusion of a composition of or for a thermoplastic composite material with a semicrystalline polyamide (PA) matrix with a glass transition temperature Tg of at least 90° C. and with a melting point Tm of less than or equal to 280° C., in particular mechanical parts based on said material, to the use of said composition for material parts and also the part which results therefrom and for applications in the motor vehicle, railroad, nautical, road transport, wind power, sport, aeronautical and space, construction, panel and leisure fields.

EP 0 261 020 describes the use of reactive semicrystalline prepolymers based on PA 6, 11 and 12 for the manufacture of a thermoplastic composite by a pultrusion process. The prepolymers of aliphatic structure as described exhibit low Tg values and insufficient mechanical performance qualities under hot conditions.

EP 550 314 describes, among its examples, (nonreactive) copolyamide compositions in a search for melting points of greater than 250° C. and limited Tg values, with the majority of the examples cited having an excessively low Tg (<80° C.) or an excessively high Tm (>300° C.).

EP 1 988 113 describes a molding composition based on a 10T/6T copolyamide with:
40 to 95 mol % of 10T
5 to 40% of 6T.

Polyamides with a high melting point of greater than 270° C. are targeted in particular. The examples mentioned and FIG. 1 teach that the melting point of these compositions is at least approximately 280° C.

WO 2011/003973 describes compositions comprising from 50 mol % to 95 mol % of a unit based on a linear aliphatic diamine comprising from 9 to 12 carbon atoms and on terephthalic acid and from 5% to 50% of unit combining terephthalic acid with a mixture of 2,2,4- and 2,4,4-trimethylhexanediamine.

US 2011306718 describes a process for the pultrusion of reactive aliphatic polyamides having low Tg values in combination with chain extenders having a polymeric structure carrying several (and much greater than 2) anhydride or epoxide functional groups. This document does not describe any nonpolymeric extender.

U.S. Pat. No. 3,696,074 describes copolyamides obtained from dodecamethylenediamine, hexamethylenediamine, terephthalic acid and adipic acid.

EP 2 586 585 describes thermoplastic composite materials having Tg values of greater than or equal to 80° C., reinforced with synthetic fibers.

The disadvantages of the state of the art, with the absence of a good compromise between the mechanical performance qualities and the processability (ease of transformation) at lower temperature with a shorter production cycle time, are overcome by the solution of the present invention which uses semicrystalline PA compositions, allowing easier processing at lower temperatures with a saving on the overall energy balance of the process for processing and in particular by injection, injection molding or extrusion, a shorter production cycle time and improved efficiency via rapid crystallizability of said polyamide polymer, while maintaining at a high level the mechanical performance qualities of said final materials. More particularly, in the case of the process using reactive compositions, the aim is to have faster reaction kinetics while having a rate and/or a temperature of crystallization of the polymer formed which are also higher.

The choice of a semicrystalline polyamide polymer, as matrix of the material in the process of the invention, has the advantage, with respect to amorphous polyamides, of significantly improved mechanical performance qualities, in particular under hot conditions, such as the creep strength or fatigue strength. In addition, exhibiting a melting point above 200° C. has the advantage in the motor vehicle industry of being compatible with treatments by cataphoresis, which a structure of amorphous PA type does not permit. As for the amorphous materials, a Tg of greater than or equal to 90° C. is sought so as to ensure good mechanical properties for the material over the entire working temperature range, for example up to 90° C. for the wind power industry, up to 100° C. for the motor vehicle industry and up to 120° C. for the aeronautics industry. Conversely, an excessively high melting point, in particular of greater than 280° C., is on the other hand harmful as it requires processing the material at higher temperatures with constraints in terms of molding equipment to be used (and associated heating system) and excessive consumption of energy with, in addition, risks of thermal degradation due to heating at temperatures higher than the melting point of said polyamide, with as a consequence the modification of the properties of the final thermoplastic matrix and of the material which results therefrom. The crystallinity of said polymer must be as high as possible but with a melting point Tm which is not too high (Tm≤280° C. and more particularly ≤270° C.), in order to optimize the mechanical performance qualities, and the crystallization rate and/or the crystallization temperature must be as high as possible, in order to reduce the extrusion, injection or molding time before ejection of the molded part, with a selective choice of the composition of said semicrystalline polyamide. Consequently, the subject matter of the present invention is a process for the manufacture of a thermoplastic material by injection, injection molding or extrusion of specific compositions of thermoplastic materials, in particular based on semicrystalline polyamide, exhibiting a good compromise between high mechanical performance qualities (mechanical strength), in particular under hot conditions, and easy processing. This means that the objective is the use of compositions which are easy to process with lower transformation and processing temperatures than those for other compositions of the state of the art, with a more favorable overall processing energy balance, a shorter cycle time and a higher productivity. More particularly, the solution of the invention, in the case of the use of reactive compositions, allows, using compositions based on semicrystalline reactive polyamide prepolymers, both fast reaction kinetics and fast crystallization kinetics with a shorter cycle time. More particularly, the polyamide polymer matrix, while having a high Tg and a limited Tm as defined, with easy processing of said material, must also have a high crystallization rate, characterized first by a difference between the melting point and the crystallization temperature Tm−Tc not exceeding 50° C., preferably not exceeding 40° C. and more particularly not exceeding 30° C. More preferably, this difference Tm−Tc does not exceed 30° C., unless Tm−Tg is <150° C., in which case (Tm−Tg<150° C.) the difference Tm−Tc can vary up to 50° C. The qualities of mechanical performance or mechanical strength under hot conditions of the material can be evaluated by the variation in the mechanical modulus between ambient temperature (23° C.) and 100° C., with maintenance of at least 75% of the mechanical performance qualities, in terms of modulus, with respect to those at ambient temperature (23° C.). Thus, the subject matter of the invention is the development of a process for the manufacture of a thermoplastic material by injection, injection molding or extrusion of a polyamide composition meeting these needs.

Thus, the first subject matter of the invention is a process for the manufacture of a thermoplastic material by injection, injection molding or extrusion of a specific semicrystalline polyamide (PA) composition for a thermoplastic material or a thermoplastic material composition, with a thermoplastic matrix having a Tg of at least 90° C. and a Tm of less than or equal to 280° C., preferably of less than 280° C., and more particularly for the manufacture of mechanical parts based on said material. This composition can be reactive by means of prepolymers which react with one another by condensation or with a chain extender by polyaddition and without removal of volatile byproducts. It can alternatively be a nonreactive composition based on polymer polyamides corresponding to the final polymer of the thermoplastic matrix. Said specific composition is based on the selective choice of at least two different amide units A and B at specific molar proportions, with the optional presence of at least a third amide unit (C) and optionally of a fourth amide unit (D), these units being different from one another.

Another subject matter of the invention is the use of said specific PA composition for the manufacture of a thermoplastic material of the same composition and more particularly of mechanical parts based on this material by injection, injection molding or extrusion.

Another subject matter of the invention is the thermoplastic material which results from said composition for material.

Finally, the invention covers a mechanical part based on material obtained by the specific process of the invention or which results from the use of the specific PA composition of the invention.

Thus, the first subject matter is a process for the manufacture of a thermoplastic material, in particular of a mechanical part based on said material, characterized in that it comprises at least one stage of injection, injection molding or molding of a composition for thermoplastic material or a thermoplastic material composition, said material comprising a thermoplastic matrix based on at least one thermoplastic polymer, with, as regards said composition:

said matrix thermoplastic polymer being a semicrystalline polyamide polymer with a glass transition temperature Tg of at least 90° C., preferably of at least 100° C., more preferably of at least 110° C., more preferably still 120° C., a melting point Tm of less than or equal to 280° C., in particular of less than 280° C., preferably of less than or equal to 270° C., in particular ranging from 220 to 270° C., said composition comprising:

a) a reactive composition comprising or consisting of at least one reactive polyamide prepolymer (or oligomer, with oligomer and prepolymer meaning the same thing for the continuation), said composition being a precursor composition of said polyamide polymer of said matrix, or, as an alternative to a), b) a nonreactive composition of at least one polyamide polymer, said composition being that of said thermoplastic matrix with the Tg and the Tm as defined above, and with:

said composition a) or b) comprising or consisting of one or more polyamides, including random or block copolyamides which are prepolymers (or oligomers) according to a) or which are polymers according to b) and which comprise different amide units A and B and optionally different amide units C and D, selected as follows:

A: is a predominant amide unit present at a molar content ranging from 55% to 95%, preferably from 55% to 85%, more preferably from 55% to 80%, more preferably still from 55% to 75%, in particular from 55% to 70%, chosen from x.T units, where x is a linear $C_9$ to $C_{18}$, preferably $C_9$, $C_{10}$, $C_{11}$ and $C_{12}$, aliphatic diamine and where T is terephthalic acid, B: is an amide unit different from A, which unit B is present at a molar content ranging from 5% to 45%, preferably from 15% to 45%, more preferably from 20% to 45%, more preferably still from 25% to 45%, in particular from 30% to 45%, depending on the Tm of the polyamide based on unit A, and with said amide unit B being chosen from x'.T units, where x' is chosen from:

B1) a branched aliphatic diamine carrying a single methyl or ethyl, preferably methyl, branch (branching meaning the same thing), in particular 2-methylpentamethylenediamine (MPMD) or 2-methyloctamethylenediamine (MOMD), and having a main chain length different by at least two carbon atoms with respect to the main chain length of the diamine x of said associated unit A, x' (according to B1)) preferably being MPMD, or B2) m-xylylenediamine (MXD) or B3) a linear $C_4$ to $C_{18}$ aliphatic diamine when, in said unit A, said diamine x is a linear $C_{11}$ to $C_{18}$ aliphatic diamine and x' is a $C_9$ to $C_{18}$ diamine when, in said unit A, said diamine x is a $C_9$ or $C_{10}$ diamine, preferably with a difference of at least two carbon atoms between the chain of diamine x of said unit A and the chain of diamine x' of said unit B, with the proviso that the unit B3 is chosen from linear $C_4$, $C_5$ and $C_7$ to $C_{18}$ aliphatic diamine when, in said unit A, said diamine x is a linear $C_{12}$ aliphatic diamine, and preferably said unit B is chosen from x'.T units, where x' is MPMD according to option B1) or MXD according to option B2) or a linear aliphatic diamine as defined above according to option B3) or more preferably x' is MPMD according to B1) or MXD according to B2) and more preferably still x' is MXD according to B2), C: optional amide unit different from A and from B and chosen from amide units based on (meaning comprising) a cycloaliphatic and/or aromatic structure or based on x'.T as defined above for B but with x' different from x' for the unit B, D: optional amide unit different from A, from B and from C when C is present and chosen from the aliphatic amide units resulting from:

$C_6$ to $C_{12}$, preferably $C_6$, $C_{11}$ and $C_{12}$, amino acids or lactams or their mixtures, or the reaction of a linear $C_6$ to $C_{18}$, preferably $C_6$ to $C_{12}$, aliphatic diacid and of a linear $C_6$ to $C_{18}$, preferably $C_6$ to $C_{12}$, aliphatic diamine or of their mixtures, and under the condition that the sum of the molar contents A+B+C+D is equal to 100%, said composition being devoid of reinforcing fibers.

The sum of the molar contents in the absence of C and D amounts to A+B=100%, with A and B making up 100%. If C is present without D, in this case this sum amounts to A+B+C=100%. If only D is present without C, said sum of 100% corresponds to A+B+D.

Advantageously, the composition comprises or consists of the units A in a proportion of from 55% to 95% and B in a proportion of from 5% to 45%, the sum of the molar contents of A+B being equal to 100%.

Advantageously, the composition comprises or consists of the units A in a proportion of from 55% to 95% and B in a proportion of from 15% to 45%, the sum of the molar contents of A+B being equal to 100%.

Advantageously, the composition comprises or consists of the units A in a proportion of from 55% to 95% and B in a proportion of from 20% to 45%, the sum of the molar contents of A+B being equal to 100%.

Advantageously, the composition comprises or consists of the units A in a proportion of from 55% to 95% and B in a proportion of from 25% to 45%, the sum of the molar contents of A+B being equal to 100%.

Advantageously, the composition comprises or consists of the units A in a proportion of from 55% to 95% and B in a proportion of from 30% to 45%, the sum of the molar contents of A+B being equal to 100%.

Advantageously, the composition comprises or consists of the units A in a proportion of from 55% to 85% and B in a proportion of from 5% to 45%, the sum of the molar contents of A+B being equal to 100%.

Advantageously, the composition comprises or consists of the units A in a proportion of from 55% to 85% and B in a proportion of from 15% to 45%, the sum of the molar contents of A+B being equal to 100%.

Advantageously, the composition comprises or consists of the units A in a proportion of from 55% to 85% and B in a proportion of from 20% to 45%, the sum of the molar contents of A+B being equal to 100%.

Advantageously, the composition comprises or consists of the units A in a proportion of from 55% to 85% and B in a proportion of from 25% to 45%, the sum of the molar contents of A+B being equal to 100%.

Advantageously, the composition comprises or consists of the units A in a proportion of from 55% to 85% and B in a proportion of from 30% to 45%, the sum of the molar contents of A+B being equal to 100%.

Advantageously, the composition comprises or consists of the units A in a proportion of from 55% to 80% and B in a proportion of from 5% to 45%, the sum of the molar contents of A+B being equal to 100%.

Advantageously, the composition comprises or consists of the units A in a proportion of from 55% to 80% and B in a proportion of from 15% to 45%, the sum of the molar contents of A+B being equal to 100%.

Advantageously, the composition comprises or consists of the units A in a proportion of from 55% to 80% and B in a proportion of from 20% to 45%, the sum of the molar contents of A+B being equal to 100%.

Advantageously, the composition comprises or consists of the units A in a proportion of from 55% to 80% and B in a proportion of from 25% to 45%, the sum of the molar contents of A+B being equal to 100%.

Advantageously, the composition comprises or consists of the units A in a proportion of from 55% to 80% and B in a proportion of from 30% to 45%, the sum of the molar contents of A+B being equal to 100%.

Advantageously, the composition comprises or consists of the units A in a proportion of from 55% to 75% and B in a proportion of from 5% to 45%, the sum of the molar contents of A+B being equal to 100%.

Advantageously, the composition comprises or consists of the units A in a proportion of from 55% to 75% and B in a proportion of from 15% to 45%, the sum of the molar contents of A+B being equal to 100%.

Advantageously, the composition comprises or consists of the units A in a proportion of from 55% to 75% and B in a proportion of from 20% to 45%, the sum of the molar contents of A+B being equal to 100%.

Advantageously, the composition comprises or consists of the units A in a proportion of from 55% to 75% and B in a proportion of from 25% to 45%, the sum of the molar contents of A+B being equal to 100%.

Advantageously, the composition comprises or consists of the units A in a proportion of from 55% to 75% and B in a proportion of from 30% to 45%, the sum of the molar contents of A+B being equal to 100%.

Advantageously, the composition comprises or consists of the units A in a proportion of from 55% to 70% and B in a proportion of from 5% to 45%, the sum of the molar contents of A+B being equal to 100%.

Advantageously, the composition comprises or consists of the units A in a proportion of from 55% to 70% and B in a proportion of from 15% to 45%, the sum of the molar contents of A+B being equal to 100%.

Advantageously, the composition comprises or consists of the units A in a proportion of from 55% to 70% and B in a proportion of from 20% to 45%, the sum of the molar contents of A+B being equal to 100%.

Advantageously, the composition comprises or consists of the units A in a proportion of from 55% to 70% and B in a proportion of from 25% to 45%, the sum of the molar contents of A+B being equal to 100%.

Advantageously, the composition comprises or consists of the units A in a proportion of from 55% to 70% and B in a proportion of from 30% to 45%, the sum of the molar contents of A+B being equal to 100%.

Advantageously, the unit B in the compositions comprising or consisting of the units A and B, the sum of the molar contents of A+B being equal to 100%, which are defined above, is a unit B1), in particular an x'.T unit where x' is MPMD, or a unit B2), in particular an x'.T unit where x' is MXD.

Advantageously, the unit B in the compositions comprising or consisting of the units A and B, the sum of the molar contents of A+B being equal to 100%, which are defined above, is a unit B2), in particular an x'.T unit where x' is MXD.

Advantageously, the unit B in the compositions comprising or consisting of the units A and B, the sum of the molar contents of A+B being equal to 100%, which are defined above, is a unit B1), in particular an x'.T unit where x' is MPMD.

Advantageously, the unit B in the compositions comprising or consisting of the units A and B, the sum of the molar contents of A+B being equal to 100%, which are defined above, is a unit B3), in particular an aliphatic diamine.

Said composition is more particularly a composition for a thermoplastic material. This means that it makes it possible to obtain a thermoplastic material by injection, injection molding or extrusion.

According to a first possibility in the process of the invention, in said composition of the invention, said polyamide, whether it is a polymer or prepolymer, comprises said amide unit according to C, different from A and from B, where the unit C as defined above is present and in partial replacement of B and at a molar content ranging up to 25%, preferably up to 20% and more preferably up to 15%, with respect to said unit B.

Advantageously, the compositions comprising or consisting of the units A and B, the sum of the molar contents of A+B being equal to 100%, which are defined above, also comprise a unit C in partial replacement of B and at a molar content ranging up to 25%, with respect to said unit B.

Advantageously, the compositions comprising or consisting of the units A and B, the sum of the molar contents of A+B being equal to 100%, which are defined above, also comprise a unit C in partial replacement of B and at a molar content ranging up to 20%, with respect to said unit B.

Advantageously, the compositions comprising or consisting of the units A and B, the sum of the molar contents of A+B being equal to 100%, which are defined above, also comprise a unit C in partial replacement of B and at a molar content ranging up to 15%, with respect to said unit B.

When the unit C is present and corresponds to x'.T with x' as defined above for the unit B, in this case C being different from B by definition, said unit C can be based on x' which is defined according to B1 and, in this case, said unit B can have x' defined according to either B2 or B3. If C is based on x' according to B2, in this case the unit B can be based on x' which is according to B1 or B3. If C is based on x' according to B3, in this case the unit B can be based on x' which is defined according to B1 or B2.

More particularly, in this unit C of said composition, said aromatic structure can be chosen, for example, from the isophthalic and/or naphthalenic structure. A terephthalic structure is possible in particular for the diacid component when the diamine is cycloaliphatic. Said cycloaliphatic structure can be chosen from a structure based on a cyclohexane ring or a structure based on a decahydronaphthalenic ring (hydrogenated naphthalenic structure).

Preferably, the structure of C is derived from an aliphatic diamine and from a cycloaliphatic and/or aromatic diacid, for example as are defined above, or from a diacid and from a cycloaliphatic diamine, for example as are defined above. More particularly, said unit C is chosen from the units resulting:
from a cycloaliphatic diamine and from terephthalic acid or
from a diacid chosen from isophthalic acid or naphthenic acid or based on cyclohexane and from a diamine x or x' as are defined above for the units A and B respectively.

According to another alternative form of the composition of the invention, said unit D is present and in partial replacement of B at a molar content which can range up to 70%, in particular up to 60%, especially up to 50% and preferably up to 15%, with respect to said unit B. Thus, according to this alternative form, said composition comprises said unit D as defined above, in particular chosen from: $C_6$ to $C_{12}$, preferably $C_6$, $C_{11}$ and $C_{12}$, amino acids or lactams, or their mixtures, or units resulting from the reaction of a linear $C_6$ to $C_{18}$, preferably $C_6$ to $C_{12}$, aliphatic diacid and of a linear $C_6$ to $C_{18}$, preferably $C_6$ to $C_{12}$, aliphatic diamine, and preferably with the units A and B being respectively based on the diamines x and x' as are defined above.

Advantageously, the compositions comprising or consisting of the units A and B, the sum of the molar contents of A+B being equal to 100%, which are defined above, also comprise a unit D in partial replacement of B and at a molar content ranging up to 70%, with respect to said unit B.

Advantageously, the compositions comprising or consisting of the units A and B, the sum of the molar contents of A+B being equal to 100%, which are defined above, also comprise a unit D in partial replacement of B and at a molar content ranging up to 60%, with respect to said unit B.

Advantageously, the compositions comprising or consisting of the units A and B, the sum of the molar contents of A+B being equal to 100%, which are defined above, also comprise a unit D in partial replacement of B and at a molar content ranging up to 50%, with respect to said unit B.

Advantageously, the compositions comprising or consisting of the units A and B, the sum of the molar contents of A+B being equal to 100%, which are defined above, also comprise a unit D in partial replacement of B and at a molar content ranging up to 15%, with respect to said unit B.

Preferably, the unit C and/or D, when it is present, partially replaces the unit B with a molar content (C+D) up to 70%, in particular up to 60%, and preferably less than 40%, with respect to the molar content of said unit B as defined according to the invention. Thus, a portion of the unit B as defined according to the invention, which represents less than 50 mol %, preferably less than 40 mol %, with respect to B, can be replaced with a unit C and/or D as are defined above according to the invention.

Advantageously, the compositions comprising or consisting of the units A and B, the sum of the molar contents of A+B being equal to 100%, which are defined above, also comprise a unit C and a unit D in partial replacement of B and at a molar content ranging up to 70%, with respect to said unit B.

Advantageously, the compositions comprising or consisting of the units A and B, the sum of the molar contents of A+B being equal to 100%, which are defined above, also comprise a unit C and a unit D in partial replacement of B and at a molar content ranging up to 60%, with respect to said unit B.

Advantageously, the compositions comprising or consisting of the units A and B, the sum of the molar contents of A+B being equal to 100%, which are defined above, also comprise a unit C and a unit D in partial replacement of B and at a molar content of less than 40%, with respect to said unit B.

Advantageously, in the compositions comprising or consisting of A, B, C and D, C, the unit C in partial replacement of B is at a molar content ranging up to 25%, with respect to said unit B, and the unit D, in partial replacement of B, is at a molar content ranging up to 70%, with respect to said unit B.

Advantageously, in the compositions comprising or consisting of A, B, C and D, C, the unit C in partial replacement of B is at a molar content ranging up to 25%, with respect to said unit B, and the unit D, in partial replacement of B, is at a molar content ranging up to 60%, with respect to said unit B.

Advantageously, in the compositions comprising or consisting of A, B, C and D, C, the unit C in partial replacement of B is at a molar content ranging up to 25%, with respect to said unit B, and the unit D, in partial replacement of B, is at a molar content ranging up to 50%, with respect to said unit B.

Advantageously, in the compositions comprising or consisting of A, B, C and D, C, the unit C in partial replacement of B is at a molar content ranging up to 20%, with respect to said unit B, and the unit D, in partial replacement of B, is at a molar content ranging up to 70%, with respect to said unit B.

Advantageously, in the compositions comprising or consisting of A, B, C and D, C, the unit C in partial replacement of B is at a molar content ranging up to 20%, with respect to said unit B, and the unit D, in partial replacement of B, is at a molar content ranging up to 60%, with respect to said unit B.

Advantageously, in the compositions comprising or consisting of A, B, C and D, C, the unit C in partial replacement of B is at a molar content ranging up to 20%, with respect to said unit B, and the unit D, in partial replacement of B, is at a molar content ranging up to 50%, with respect to said unit B.

Advantageously, in the compositions comprising or consisting of A, B, C and D, C, the unit C in partial replacement of B is at a molar content ranging up to 15%, with respect to said unit B, and the unit D, in partial replacement of B, is at a molar content ranging up to 70%, with respect to said unit B.

Advantageously, in the compositions comprising or consisting of A, B, C and D, C, the unit C in partial replacement of B is at a molar content ranging up to 15%, with respect to said unit B, and the unit D, in partial replacement of B, is at a molar content ranging up to 60%, with respect to said unit B.

Advantageously, in the compositions comprising or consisting of A, B, C and D, C, the unit C in partial replacement of B is at a molar content ranging up to 15%, with respect to said unit B, and the unit D, in partial replacement of B, is at a molar content ranging up to 50%, with respect to said unit B.

Advantageously, in the compositions comprising or consisting of A, B, C and D, C, the unit C in partial replacement of B is at a molar content ranging up to 25%, with respect to said unit B, and the unit D, in partial replacement of B, is at a molar content ranging up to 15%, with respect to said unit B.

Advantageously, in the compositions comprising or consisting of A, B, C and D, C, the unit C in partial replacement of B is at a molar content ranging up to 20%, with respect to said unit B, and the unit D, in partial replacement of B, is at a molar content ranging up to 15%, with respect to said unit B.

Advantageously, in the compositions comprising or consisting of A, B, C and D, C, the unit C in partial replacement of B is at a molar content ranging up to 15%, with respect to said unit B, and the unit D, in partial replacement of B, is at a molar content ranging up to 15%, with respect to said unit B.

More particularly, the difference Tm−Tc between the melting point Tm and the crystallization temperature Tc of said matrix polymer (polyamide) does not exceed 50° C., preferably does not exceed 40° C. and more particularly does not exceed 30° C.

In particular, Tm−Tc does not exceed 30° C. unless Tm−Tg is less than 150° C., in which case Tm−Tc can range up to 50° C.

According to a specific option, the enthalpy of crystallization of said matrix polymer, measured by differential scanning calorimetry (DSC) according to the standard ISO 11357-3:2013, is greater than 40 J/g, preferably greater than 45 J/g.

Preferably, said amide unit A, as defined according to the invention above and below, is present at a molar content ranging from 55% to 80%, more preferentially from 55% to 75% and more preferably still from 55% to 70%, with respect to all of the units of said matrix polymer (polyamide) as defined above according to the invention.

According to a first option preferred in the process according to the invention described above, said composition has a unit B with x' defined according to option B1 described above, in particular with, as more preferred diamine for said unit B, MPMD. The unit A remains as defined above, that is to say x.T, with x a linear $C_9$ to $C_{18}$, preferably $C_9$, $C_{10}$, $C_{11}$ or $C_{12}$, aliphatic diamine.

According to a second option preferred in the process according to the invention, said composition has a unit B where x' is MXD according to option B2 defined above. The unit A remains as defined for the first option mentioned. This second option constitutes, together with the first mentioned above, the options which are the most preferred of the invention and in particular this second option is the most preferred of the invention.

A third preferred option is that where B is defined according to option B1 or B2 or B3 as defined above and with the presence of a unit C as defined above in replacement of B and up to 25 mol %, preferably up to 20 mol % and more preferably up to 15 mol %, and in particular with B being defined according to the first or second option as defined above.

More preferably still, said polyamide composition is based on the units A and B selected as follows:
  for the unit A which is 9T, said unit B is selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferably MPMD.T or MXD.T, with a molar content of B ranging from 30% to 45%,
  for the unit A which is 10T, said unit B is selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferably MPMD.T or MXD.T, with a molar content of B ranging from 25% to 45%,
  for the unit A which is 11T, said unit B is selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferably MPMD.T or MXD.T, with a molar content of B ranging from 20% to 45%,
  for the unit A which is 12T, said unit B is selected from: 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferably MPMD.T or MXD.T, with a molar content of B ranging from 20% to 45%.

According to this selection, in the process according to the invention, a more specific first composition can be defined with the unit A being a 9T unit and the unit B being selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferably MPMD.T or MXD.T, with a molar content of B ranging from 30% to 45%. A second specific composition corresponds to a unit A being a 10T unit and the unit B being selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferably MPMD.T or MXD.T, with a molar content of B ranging from 25% to 45%. A third specific composition corresponds to a unit A being an 11T unit and the unit B being selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferably MPMD.T or MXD.T, with a molar content of B ranging from 20% to 45%. Finally, another specific composition corresponds to a unit A being a 12T unit and the unit B being selected from: 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferably MPMD.T or MXD.T, with a molar content of B ranging from 20% to 45%.

With regard to the reactivity or nonreactivity of said polyamide composition, according to a first option, said polyamide composition can be a nonreactive composition according to b). This means that said composition is the same as that of the matrix polymer (polyamide) of said material, since there is an absence of reaction in this composition, which remains stable and unchanging in terms of molecular weight when it is heated for the processing of the material of the invention. The characteristics of the polyamide polymer in this composition are the same, with Tg and Tm as already defined above, as those of the final polymer, which is the semicrystalline polyamide obtained by a reactive composition a) (see below), said polymer constituting by definition said thermoplastic matrix of said material. The polyamides according to b) are obtained by a conventional polycondensation reaction from the monomer components which are diamines, diacids and optionally amino acids or lactams, with the proportions and natures of the monomers being chosen as a function of the selected units of the invention, A and B and optionally C and D.

The number-average molecular weight Mn of said final polymer (polyamide) of the thermoplastic matrix of said material is preferably within a range extending from 10 000 to 40 000, preferably from 12 000 to 30 000. These Mn values can correspond to intrinsic viscosities of greater than or equal to 0.8. These polyamides according to composition b) are nonreactive, either because of the low content of reactive (residual) functional groups present, in particular with a content of said functional groups<120 meq/kg, or because of the presence of end functional groups of the same type at the chain end which are therefore nonreactive with one another, or because of the modification and blocking of said reactive functional groups by a monofunctional reactive component, for example, for the amine functional groups, by a modification reaction with a monoacid or a monoisocyanate and, for carboxyl functional groups, by reaction with a monoamine. When said final matrix polymer results from a reactive prepolymer in a reactive precursor composition a), this reactive prepolymer has an Mn which is at least two times lower than that of said final matrix polymer.

According to a second option, said polyamide composition can be a reactive prepolymer composition according to a) and precursor or precursor composition of said polyamide polymer of said matrix of the material.

In this second option, according to the reactive composition a), three more particular possibilities can be distinguished. According to a first possibility, said composition a) can comprise or consist of at least one reactive prepolymer (polyamide) carrying, on the same chain (that is to say, on the same prepolymer), two end functional groups X' and Y' which are respectively coreactive with one another by condensation, with X' and Y' being amine and carboxyl or carboxyl and amine respectively. According to a second possibility, said reactive composition a) can comprise or consist of at least two polyamide prepolymers which are reactive with one another and which each respectively carry two end functional groups X' or Y', which are identical (identical for the same prepolymer and different between the two prepolymers), said functional group X' of a prepolymer being able to react only with said functional group Y' of the other prepolymer, in particular by condensation, more particularly with X' and Y' being amine and carboxyl or carboxyl and amine respectively. This condensation (or polycondensation) reaction can bring about the elimination of byproducts. The latter can be removed by preferably working according to a process using an open-mold technology. In the case of a closed-mold process, a stage of venting, preferably under vacuum, the byproducts eliminated by the reaction is present, in order to prevent the formation of microbubbles of the byproducts in the final material, which (microbubbles) can affect the mechanical performance qualities of said material if they are not removed in this way. According to a third option of reactive composition a), said composition a) or precursor composition a) can comprise or consist of:

a1) at least one prepolymer of said thermoplastic polyamide polymer (of the matrix) as already defined above, with this prepolymer carrying n identical end reactive functional groups X chosen from: —$NH_2$ (amine), —$CO_2H$ (carboxyl) and —OH (hydroxyl), preferably —$NH_2$ (amine) and —$CO_2H$ (carboxyl), with n being from 1 to 3, preferably from 1 to 2, more preferably 1 or 2, more particularly 2 a2) at least one chain extender Y-A'-Y, with A' being a hydrocarbon biradical of nonpolymeric structure (neither polymer nor oligomer nor prepolymer), carrying 2 identical end reactive functional groups Y, which are reactive by polyaddition (without elimination of reaction byproduct) with at least one functional group X of said prepolymer a1), preferably with a molecular weight of less than 500 and more preferably of less than 400.

$NH_2$ (amine) means primary and secondary amine.

In the latter case (third option), the semicrystalline structure of said polyamide polymer of the matrix of said material is essentially provided by the structure of said prepolymer a1), which is also semicrystalline.

Mention may be made, as suitable examples of extenders a2) as a function of the functional groups X carried by said semicrystalline polyamide prepolymer a1), of the following:

when X is $NH_2$ or OH, preferably $NH_2$:
  either the chain extender Y-A'-Y corresponds to
    Y chosen from the following groups: maleimide, optionally blocked isocyanate, oxazinone and oxazolinone, or cyclic anhydride, preferably oxazinone and oxazolinone
  and
    A' is a carbon-based spacer or a carbon-based radical carrying the reactive groups or functional groups Y, chosen from:
      a covalent bond between two functional groups (groups) Y in the case where Y=oxazinone and oxazolinone or
      an aliphatic hydrocarbon chain or an aromatic and/or cycloaliphatic hydrocarbon chain, the latter two comprising at least one optionally substituted ring of 5 or 6 carbon atoms, with optionally said aliphatic hydrocarbon chain optionally having a molecular weight of 14 to 200 g·mol$^{-1}$
  or the chain extender Y-A'-Y corresponds to Y being a caprolactam group and to A' being able to be a carbonyl radical, such as carbonylbiscaprolactam, or to A' being able to be a terephthaloyl or an isophthaloyl
  or said chain extender Y-A'-Y carries a cyclic anhydride group Y, and preferably this extender is chosen from a cycloaliphatic and/or aromatic carboxylic dianhydride and more preferably it is chosen from: ethylenetetracarboxylic dianhydride, pyromellitic dianhydride, 3,3',4,4'-biphenyltetracarboxylic dianhydride, 1,4,5,8-naphtalenetetracarboxylic dianhydride, perylenetetracarboxylic dianhydride, 3,3',4,4'-benzophenone tetracarboxylic dianhydride, 1,2,3,4-cyclobutanetetracarboxylic dianhydride, hexafluoroisopropylidene bisphthalic dianhydride, 9,9-bis(trifluoromethyl)xanthenetetracarboxylic dianhydride, 3,3',4,4'-diphenylsulfone tetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride or their mixtures and when X is COOH:
said chain extender Y-A'-Y corresponds to:
Y chosen from the following groups: oxazoline, oxazine, imidazoline, aziridine, such as 1,1'-iso- or terephthaloyl bis(2-methylaziridine), or epoxy
A' being a carbon-based spacer (radical) as defined above.

More particularly, when, in said extender Y-A'-Y, said functional group Y is chosen from oxazinone, oxazolinone, oxazine, oxazoline or imidazoline, in this case, in the chain extender represented by Y-A'-Y, A' can represent an alkylene, such as —(CH$_2$)$_m$— with m ranging from 1 to 14 and preferably from 2 to 10, or A' can represent a cycloalkylene and/or an arylene which is substituted (alkyl) or unsubstituted, such as benzenic arylenes, for example o-, m- or p-phenylenes, or naphthalenic arylenes, and preferably A' is an arylene and/or a cycloalkylene.

In the case where Y is an epoxy, the chain extender can be chosen from: bisphenol A diglycidyl ether (BADGE) and its hydrogenated (cycloaliphatic) derivative bisphenol F diglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with an Mn<500, polypropylene glycol diglycidyl ether with an Mn<500, polytetramethylene glycol diglycidyl ether with an Mn<500, resorcinol diglycidyl ether, neopentyl glycol diglycidyl ether, bisphenol A polyethylene glycol diglycidyl ether with an Mn<500, bisphenol A polypropylene glycol diglycidyl ether with an Mn<500, diglycidyl esters of a dicarboxylic acid, such as terephthalic acid glycidyl ester, or epoxidized diolefins (dienes) or fatty acids with a double epoxidized ethylenic unsaturation, diglycidyl 1,2-cyclohexanedicarboxylate; and their mixtures.

Advantageously, X is NH$_2$ or OH, in particular NH$_2$, and Y is chosen from an oxazinone and an oxazolinone.

Advantageously, X is CO$_2$H and Y is chosen from an epoxy and an oxazoline.

More advantageously, X est CO$_2$H and Y-A'-Y is chosen from phenylenebisoxazolines, preferably 1,3-phenylenebis(2-oxazoline) or 1,4-phenylenebis(2-oxazoline) (PBO).

In the case of carbonyl- or terephthaloyl- or isophthaloyl-biscaprolactam as chain extender Y-A'-Y, the preferred conditions avoid the elimination of byproduct, such as caprolactam, during said polymerization and processing in the molten state.

In the optional case mentioned above where Y represents a blocked isocyanate functional group, this blocking can be obtained by blocking agents for the isocyanate functional group, such as epsilon-caprolactam, methyl ethyl ketoxime, dimethylpyrazole or diethyl malonate.

Likewise, in the case where the extender is a dianhydride which reacts with a prepolymer P(X)n where X=NH$_2$, the preferred conditions prevent any formation of an imide ring during the polymerization and during the processing in the molten state.

For X=OH or NH$_2$, the group Y is preferably chosen from: isocyanate (nonblocked), oxazinone and oxazolinone, more preferably oxazinone and oxazolinone, with, as spacer (radical), A', which is as defined above.

Reference may be made, as examples of chain extenders carrying oxazoline or oxazine reactive functional groups Y which are suitable for the implementation of the invention, to those described under references "A", "B", "C" and "D" on page 7 of the application EP 0 581 642, and also to their processes of preparation and their modes of reaction which are disclosed therein. "A" in this document is bisoxazoline, "B" is bisoxazine, "C" is 1,3 phenylenebisoxazoline and "D" is 1,4-phenylenebisoxazoline.

Reference may be made, as examples of chain extenders having an imidazoline reactive functional group Y which are suitable for the implementation of the invention, to those described ("A" to "F") on pages 7 to 8 and table 1 on page 10 in the application EP 0 739 924, and also to their processes of preparation and their modes of reaction which are disclosed therein.

Reference may be made, as examples of chain extenders having a reactive functional group Y=oxazinone or oxazolinone which are suitable for the implementation of the invention, to those described under references "A" to "D" on pages 7 to 8 of the application EP 0 581 641, and also to their processes of preparation and their modes of reaction which are disclosed therein.

Mention may be made, as examples of oxazinone (ring having 6 atoms) and oxazolinone (ring having 5 atoms) groups Y which are suitable, of the groups Y derived from: benzoxazinone, oxazinone or oxazolinone, with as spacer A' which can be a covalent single bond with for respective corresponding extenders being: bis(benzoxazinone), bisoxazinone and bisoxazolinone.

A' can also be a C$_1$ to C$_{14}$, preferably C$_2$ to C$_{10}$, alkylene but A' is preferably an arylene and more particularly it can be a phenylene (substituted by Y in the 1,2 or 1,3 or 1,4 positions) or a naphthalene radical (disubstituted by Y) or a phthaloyl (iso- or terephthaloyl) or A' can be a cycloalkylene.

For the Y functional groups such as oxazine (6-membered ring), oxazoline (5-membered ring) and imidazoline (5-membered ring), the radical A' can be as described above with it being possible for A' to be a single covalent bond and with the respective corresponding extenders being: bisoxazine, bisoxazoline and bisimidazoline. A' can also be a C$_1$ to C$_{14}$, preferably C$_2$ to C$_{10}$, alkylene. The radical A' is preferably an arylene and it can more particularly be a phenylene (substituted by Y in the 1,2 or 1,3 or 1,4 positions) or a naphthalene radical (disubstituted by Y) or a phthaloyl (iso- or terephthaloyl) or A' can be a cycloalkylene.

In the case where Y=aziridine (3-membered nitrogenous heterocycle equivalent to ethylene oxide with replacement of the ether —O— by —NH—), the radical A' can be phthaloyl a (1,1'-iso- or terephthaloyl) with, as an example of an extender of this type, 1,1'-isophthaloylbis(2-methylaziridine).

The presence of a catalyst of the reaction between said prepolymer P(X)n and said extender Y-A'-Y at a content ranging from 0.001% to 2%, preferably from 0.01% to 0.5%, with respect to the total weight of the two coreactants mentioned, can accelerate the (poly)addition reaction and thus shorten the production cycle. Such a catalyst can be chosen from: 4,4'-dimethylaminopyridine, p-toluenesulfonic acid, phosphoric acid, NaOH and optionally those described for a polycondensation or transesterification as described in EP 0 425 341, page 9, lines 1 to 7.

According to a more specific case of the choice of said extender, A' can represent an alkylene, such as —$(CH_2)_m$— with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthalenylenes). Preferably, A' represents an arylene which can be substituted or unsubstituted benzenic or naphthalenic.

As already specified, said chain extender (a2) has a nonpolymeric structure and preferably a molecular weight of less than 500, more preferentially of less than 400.

Said reactive prepolymers of said reactive composition a), according to the three abovementioned options, have a number-average molecular weight Mn ranging from 500 to 10 000, preferably from 1000 to 6000, determined in particular by calculation starting from the content of end functional groups, determined by potentiometric titration in solution, and the functionality of said prepolymers. The weights Mn can also be determined by size exclusion chromatography or by NMR.

The content of said extender in said polyamide prepolymer varies from 1% to 20%, in particular from 5% to 20%.

In the process of the invention and in the case of the reactive compositions according to definition a), said reactive prepolymers are prepared by a conventional polycondensation reaction between the corresponding diamine and diacid components, and optionally (as a function of the unit D) amino acid or lactam components, the natures and proportions of the units A and B and optionally C and D being observed. The prepolymers carrying X' and Y' amine and carboxyl functional groups on the same chain can be obtained, for example, by adding a combination of monomers (amino acid, diamine, diacid) exhibiting in total an equal amount of amine and carboxyl units. Another route for obtaining these prepolymers carrying an X' functional group and a Y' is, for example, by combining a prepolymer carrying 2 identical X'=amine functional groups with a diacid prepolymer carrying Y'=carboxyl, with an overall molar content of acid functional groups equal to that of the starting amine functional groups X'.

In order to obtain prepolymers functionalized with identical (amine or carboxyl) functional groups on the same chain, it is sufficient to have an excess of diamine (or of amine functional groups overall) in order to have amine end functional groups or an excess of diacid (or of carboxyl functional groups overall) in order to have carboxyl end functional groups.

In the case of a prepolymer P(X)n with n identical functional groups X, the functionality 1 can be obtained in the presence of a blocking monofunctional component (monoacid or monoamine, depending on the nature of X=amine or carboxyl).

A functionality n=2 can be obtained starting from bifunctional components: diamines and diacids with excess of one to attach X depending on this excess.

For n=3, for example, for a prepolymer P(X)n, the presence of a trifunctional component is necessary, for example the presence of a triamine (one mol per prepolymer chain) with a diamine in the reaction with a diacid. The preferred functionality for P(X)n is n=2.

The expression "reinforcing fibers" denotes an assemblage of short or long fibers, for example inorganic fibers, polymeric fibers or a mixture of these, and the composition used in the process of the invention is thus devoid of them.

More particularly, the process of the invention is a process for the injection, injection molding or extrusion of a composition as defined above. Said composition can comprise fillers and additives other than reinforcing fibers.

Mention may be made, among suitable fillers, for example, of inorganic or organic fillers: carbon black, carbon nanotubes (CNTs), carbon nanofibrils, glass beads or ground recycled polymers in the powder form.

Mention may be made, among suitable additives, of additives which absorb in the UV or IR region so as to allow welding of the material obtained, by a laser technology (UV or IR), and heat stabilizers chosen from antioxidants of sterically hindered phenol or sterically hindered amine (HALS) type. The function of these stabilizers is to prevent thermal oxidation and photooxidation and subsequent degradation of the matrix polyamide of the material obtained.

Advantageously, the process of the invention by injection, injection molding or extrusion of a composition as defined above comprises at least one stage of polymerization of at least one reactive composition a) as defined above according to the invention or a stage of molding or processing of at least one nonreactive composition b) as defined above according to the invention.

More particularly, said process can comprise the following stages:
i) injection of a composition devoid of fibrous reinforcer as defined above according to the invention into an open or closed mold or out of mold,
ii) a polymerization reaction by heating said composition of stage i), in the case of a reactive composition a) of polyamide as defined according to the invention, with chain extension (increase in molecular weight), as the case may be, by a polycondensation reaction (including selfcondensation of one and the same prepolymer) or by a bulk melt polyaddition reaction, with, in the case of the polycondensation, removal under vacuum of the condensation products when a closed mold is involved, using a vacuum extraction system, otherwise and preferably with the polycondensation being carried out in an open mold or out of mold,
iii) processing or molding of said composition of stage i), in the case of a nonreactive polyamide composition b) as defined according to the invention, in order to form the final part in a mold or with another processing system, and, in the case of a reactive composition a), a stage of processing by molding or by another processing system and simultaneously with polymerization stage ii).

Advantageously, the process according to the invention can also comprise the following stages:
i) a polymerization reaction in the case of a reactive composition a) of polyamide as defined above, by heating said composition of stage i) with chain extension, as the case may be, by a polycondensation reaction or by a bulk melt polyaddition reaction, with, in the case of the polycondensation, removal under vacuum of the condensation products using a vacuum extraction system, in order to obtain a nonreactive composition,
ii) extrusion of the nonreactive composition resulting from stage i) or of a nonreactive composition as defined above devoid of fibrous reinforcer, In said process according to the invention, said processing can preferably be carried out according to a RIM or injection-compression process, in particular in the case of a reactive composition a).

Another subject matter of the invention is the use of a composition as defined above or the use of a nonreactive semicrystalline polyamide polymer as defined according to said composition b) or a polymer capable of being obtained from a reactive composition as defined according to said composition a) for the manufacture of a thermoplastic material, more particularly of a mechanical part, such as monolayer or multilayer pipe, or of film based on said composition or said material.

According to a more specific use, said mechanical parts of said material relate to applications in the motor vehicle, electrical or electronics, railroad, nautical, wind power, photovoltaic, solar energy, including solar panels and components of solar power stations, sport, aeronautical and space, road transport (regarding trucks), construction, civil engineering, panel or leisure fields.

Advantageously, said parts for applications in the motor vehicle industry are parts under an engine hood for fluid transportation, in particular in air intake devices, cooling devices (cooling, for example, by air, cooling liquid, and the like) or devices for transporting or transferring fuels or fluids (such as oil, water, and the like).

Advantageously, said mechanical parts for applications in the electrical or electronics industry are electrical and electronic goods, such as encapsulated solenoids, pumps, telephones, computers, printers, fax machines, modems, monitors, remote controls, cameras, circuit breakers, electrical cable jackets, optical fibers, switches or multimedia systems. These components of electrical and electronic goods cover not only the structural parts of such goods (casings, housings, and the like) but also their optional associated accessories (earphones, connecting elements, cables, and the like).

More particularly, three more preferred applications can be distinguished depending on the temperature at which said parts made of material according to the invention are used:
in the wind power industry, with a Tg of said thermoplastic matrix polyamide of at least 90° C.
in the motor vehicle industry, with a Tg of said polyamide of at least 100° C.
in the aeronautical industry, with a Tg of said polyamide of at least 120° C.

This means that, for a Tg of at least 100° C., it can have two possible applications: motor vehicle industry and wind power industry, and, if the Tg is at least 120° C., it can have an application in the wind power and motor vehicle industries, in addition to the aeronautical industry.

The present invention also covers a thermoplastic material resulting from the use of at least one composition for thermoplastic material devoid of reinforcing fibers as defined above according to the present invention.

Lastly, the invention relates to a mechanical part of thermoplastic material, which results from the use of at least one composition of the invention as defined above or from the use of a nonreactive semicrystalline polyamide polymer as defined according to said composition b) or a polymer capable of being obtained from a reactive composition as defined according to said composition a) or from a thermoplastic material as defined above, or which part is obtained by a process as defined above according to the invention.

According to another option, it is a part for the wind power industry, in particular with a Tg of at least 100° C.

According to a third specific option, it is a part for the aeronautical industry, in particular with a Tg of at least 120° C.

According to a fourth option, it is a mechanical part for applications in the motor vehicle industry, such as parts under an engine hood for fluid transportation, in particular in air intake devices, cooling devices (cooling, for example, by air, cooling liquid, and the like) or devices for transporting or transferring fuels or fluids (such as oil, water, and the like).

According to a fifth option, it is a mechanical part for applications in the electrical or electronics industry, such as electrical and electronic goods, such as encapsulated solenoids, pumps, telephones, computers, printers, fax machines, modems, monitors, remote controls, cameras, circuit breakers, electrical cable jackets, optical fibers, switches or multimedia systems.

Methods for Determining the Characteristics Mentioned

The melt viscosity of the prepolymer or of the precursor composition is measured according to the reference manual of the constructor of the measurement device used, which is a Physica MCR301 rheometer, under nitrogen flushing at the given temperature under shearing of 100 $s^{-1}$, between two parallel plates with a diameter of 50 mm.

The Mn of the thermoplastic polymer or prepolymer is determined from the titration (quantitative determination) of the end functional groups according to a potentiometric method (direct quantitative determination for $NH_2$ or carboxyl) and from the theoretical functionality, which is 2 (as end functional groups) for linear prepolymers and polymers prepared from bifunctional monomers alone.

The measurement of the intrinsic or inherent viscosity is carried out in m-cresol.

The method is well known to a person skilled in the art. The standard ISO 307:2007 is followed, but changing the solvent (use of m-cresol instead of sulfuric acid), the temperature (20° C.) and the concentration (0.5% by weight).

The glass transition temperature Tg of the thermoplastic polymers used is measured using a differential scanning calorimeter (DSC), after a second heating pass, according to the standard ISO 11357-2:2013. The heating and cooling rate is 20° C./min.

The melting point Tm and the crystallization temperature Tc are measured by DSC, after a first heating, according to the standard ISO 11357-3:2013. The heating and cooling rate is 20° C./min.

The enthalpy of crystallization of said matrix polymer is measured by differential scanning calorimetry (DSC) according to the standard ISO 11357-3:2013.

EXAMPLES

A—Preparation of a Polyamide Polymer by the Direct Route (without Chain Extension of a Reactive Prepolymer)

5 kg of the following starting materials are introduced into a 14-liter autoclave reactor:
500 g of water,
the diamine or diamines,
the amino acid (optionally),
the diacid or diacids,
the monofunctional chain regulator: benzoic acid, in an amount suitable for the targeted Mn and varying (benzoic acid) from 50 to 100 g, 35 g of sodium hypophosphite in solution,
0.1 g of a Wacker AK1000 antifoaming agent (Wacker Silicones).

The natures and molar ratios of the molecular structures and units of the polyamides (by referenced test) are given in table 1 below.

The closed reactor is purged of its residual oxygen and then heated to a temperature of 230° C. with respect to the material introduced. After stirring for 30 minutes under these conditions, the pressurized vapor which has formed in the reactor is gradually reduced in pressure over 60 minutes, while gradually increasing the internal temperature so that it becomes established at Tm+10° C. at atmospheric pressure.

The polymerization is then continued under nitrogen flushing of 20 l/h until the targeted weight Mn shown in the characteristics table is obtained.

The polymer is subsequently emptied out via the bottom valve, then cooled in a water trough and then granulated.

The results are presented in the following table 1.

state of the prior art cited, in particular in terms of low Tm−Tc difference (<30° C.) and for Tm−Tc ranging from 30 to 50° C. with Tm−Tg difference<150° C.

B—Preparation of a Polyamide Polymer by Chain Extension of a Reactive Prepolymer (or Oligomer)

B-1 Preparation of the Reactive Prepolymer P(X)n 5 kg of the following starting materials are introduced into a 14-liter autoclave reactor:
500 g of water,
the diamine or diamines,
the amino acid (optionally),
terephthalic acid,
35 g of sodium hypophosphite in solution,
0.1 g of a Wacker AK1000 antifoaming agent (Wacker Silicones).

The natures and molar ratios of the molecular structures and units of the reactive prepolymer polyamides (by referenced test) are given in table 2 below.

The closed reactor is purged of its residual oxygen and then heated at a temperature of 230° C. of the material. After

TABLE 1

Characteristics of the polymers prepared by the direct route without reactive prepolymer

| Ref | Test type | Molecular structure/Molar composition | Tm (° C.)/Tg (° C.) | Tm − Tg (° C.) | Tc (° C.) | Tm − Tc (° C.) | ΔHc (J/g) | Inherent viscosity (m-cresol) | Ends of nonreactive chains meq/kg (**) (calc) | Acid number meq/kg | Amine number meq/kg | Mn g/mol |
|---|---|---|---|---|---|---|---|---|---|---|---|---|
| 1 | Comparative (EP 1 988 113) | 10.T/6.T (59/41) | 281/122 | 159 | 236 | 45 | 44 | 1.12 | 103 | 45 | 60 | 9600 |
| 2 | Comparative (EP 1 988 113) | 10.T/6.T/11 (60/24/16) | 269/111 | 158 | 220 | 49 | 39 | 1.25 | 91 | 55 | 48 | 10 300 |
| 3 | Comparative (WO 2011/00393) | 10.T/TMD.T (59/41) | 263/133 | 130 | 197 | 66 | 35 | 1.15 | 97 | 63 | 35 | 10 250 |
| 4 | Comparative | 10.T (100) | 314/120 | 194 | 279 | 35 | 63 | insoluble | 154 | 54 | 22 | 8700 |
| 5 | Comparative | 10.T/11 (67/33) | 269/84 | 185 | 232 | 37 | 50 | 1.19 | 119 | 55 | 40 | 9350 |
| 6 | Comparative | 10.T/11 (59/41) | 261/78 | 183 | 213 | 48 | 39 | 1.15 | 112 | 22 | 34 | 11 900 |
| 7 | Comparative | 10.T/10.I (67/33) | 269/110 | 159 | 205 | 64 | 32 | 1.12 | 97 | 48 | 51 | 10 100 |
| 8 | Comparative | MXD.T/11 (59/41) | 211/111 | 100 | (*) | >100 | 12 | 1.25 | | | | |
| 9 | Comparative | MPMD.T/11 (59/41) | —/84 | — | (*) | — | — | 1.14 | | | | |
| 10 | According to the invention | 10.T/MXD.T (67/33) | 270/130 | 140 | 244 | 26 | 47 | 1.03 | 143 | 85 | 42 | 7400 |
| 11 | According to the invention | 10.T/MXD.T (59/41) | 269/131 | 138 | 241 | 28 | 44 | 1.01 | 100 | 134 | 38 | 7350 |
| 12 | Comparative, outside the invention | 10.T/MXD.T (50/50) | 262/137 | 125 | 211 | 51 | 17 | 0.99 | 136 | 97 | 37 | 7400 |
| 13 | According to the invention | 10.T/MPMD.T (67/33) | 270/124 | 146 | 230 | 40 | 45 | 1.05 | 139 | 63 | 42 | 8200 |
| 14 | According to the invention | 10.T/MPMD.T (59/41) | 264/126 | 138 | 219 | 45 | 40 | 1.11 | 155 | 59 | 27 | 8300 |
| 15 | Comparative, outside the invention | 10.T/MPMD.T (50/50) | 245/127 | 118 | 185 | 60 | 22 | 1.12 | | | | |
| 16 | Comparative, outside the invention | 10.T/12.T (59/41) | 280/114 | 166 | 260 | 20 | 62 | 0.81 | 0 | 263 | <10 | 7600 |
| 17 | According to the invention | 10.T/12.T/11 (60/24/16) | 271/105 | 166 | 246 | 25 | 56 | 0.98 | 169 | 49 | 32 | 8000 |
| 18 | According to the invention | 18.T/MXD.T (71/29) | 264/95 | 169 | 242 | 22 | 47 | 0.86 | 174 | 73 | 35 | 7100 |

(*) No crystallization on cooling
(**) Milliequivalents per kilogram

The representative tests of the invention show superior performance qualities compared with the comparative tests outside the invention, including some representative of the stirring for 30 minutes under these conditions, the pressurized vapor which has formed in the reactor is gradually reduced in pressure over 60 minutes, while gradually increasing the internal temperature so that it becomes established at Tm+10° C. at atmospheric pressure.

The oligomer (prepolymer) is subsequently emptied out via the bottom valve, then cooled in a water trough and then ground.

The characteristics are presented in the following table 2.

TABLE 2

Characteristics of the prepolymers prepared

| Ref | Molecular structure and molar composition | Tm (° C.) | Tg (° C.) | Tm – Tg (° C.) | Tc (° C.) | Tm – Tc (° C.) | ΔH (J/g) | Inherent viscosity (in m-cresol) | Acid number meq/kg (*) | Amine number meq/kg | Mn g/mol |
|---|---|---|---|---|---|---|---|---|---|---|---|
| 19 According to the invention | 10.T/MXD.T (59/41) | 264 | 117 | 147 | 232 | 32 | 42 | 0.32 | 878 | 0 | 2280 |
| 20 According to the invention | 10.T/MPMD.T (59/41) | 265 | 109 | 156 | 221 | 44 | 41 | 0.32 | 858 | 0 | 2330 |

(*) Milliequivalents per kilogram

B-2 Preparation of the Polyamide Polymer by Chain Extension with an Extender of Y-A-Y Type 10 g of the dried and ground oligomer above are mixed with a stoichiometric amount of 1,3-phenylenebisoxazoline (PBO). The mixture is introduced under nitrogen flushing into a DSM corotating conical-screw microextruder (15 ml in volume) preheated to 280° C. with rotation of the screws at 100 rev/min. The mixture is left to recirculate in the microextruder and the increase in the viscosity is monitored by measuring the normal force. After approximately 2 minutes, a plateau is reached and the contents of the microextruder are emptied out in the form of a rod. The air-cooled product is granulated.

The results of the product analyses are presented in table 3 below.

TABLE 3

Analytical characteristics of the polyamides obtained with chain extension

| Ref | Molecular structure/Molar composition | Tm (° C.) | Tg (° C.) | Tm – Tg (° C.) | Tc (° C.) | Tm – Tc (° C.) | ΔH (J/g) | Inherent viscosity (in m-cresol) |
|---|---|---|---|---|---|---|---|---|
| 21 According to the invention | 10.T/MXD.T (59/41) | 256 | 135 | 121 | 219 | 37 | 30 | 1.3 |
| 22 According to the invention | 10.T/MPMD.T (59/41) | 262 | 128 | 134 | 210 | 52 | 36 | 0.82 |

C—Formulation of the Material Devoid of Reinforcing Fibers

C-1 Preparation of the Formulation

The granules resulting from stage A are compounded on an Evolum 32 twin-screw extruder according to a flat temperature profile of 280° C. The flow rate is 40 kg/h and the speed is 300 rev/min. The polymer (97.3% by weight) and the additives (0.3% of calcium stearate and 0.4% of Irganox 1010) are introduced into the main hopper. The rods are cooled in water and granulated.

The composition based on 10.T/MXDT always exhibits a higher crystallizability in combination with a very high Tg and in particular a low Tm–Tg.

C-2 Mechanical Properties (Temperature Stability) with the Temperature

The granules of the formulations above are shaped into 80*10*4 mm bars by injection molding using a Krauss Maffei 60 tonnes B2 device equipped with a screw having a diameter Ø of 30 mm. The samples were injected at 260° C. into a mold at 90° C. at 130 rev/min (measured internal pressure of 833 bar). The substance was kept under pressure at 611 bar for 15 s, before the mold was cooled in 20 s.

3-point bending tests according to the standard ISO 178 are carried out at different temperatures on a Zwick 1 dynamometer. The radii of the punch and supports are 5 mm. The rate is 2 mm/min and the modulus is calculated between 0.05 and 0.25% of deformation.

The invention claimed is:

1. A process for the manufacture of a thermoplastic material, in particular of a mechanical part based on said material, wherein the process comprises at least one stage of molding by injection or one stage of processing by extrusion of a polyamide composition for thermoplastic material or thermoplastic material composition, said material comprising a thermoplastic matrix based on at least one thermoplastic polymer, wherein:
    said matrix thermoplastic polymer is a semicrystalline polyamide polymer with a glass transition temperature Tg of at least 90° C. and with a melting point Tm of less than or equal to 280° C., as respectively determined according to the standards ISO 11357-2:2013 and 11357-3:2013,
    said composition comprises:
        a) a reactive composition comprising at least one reactive polyamide prepolymer, said composition being a precursor composition of said polyamide polymer of said matrix, or, as an alternative to a),
  b) a nonreactive composition of at least one polyamide polymer, including the polymer resulting from a), said composition being that of said matrix thermoplastic polymer, and
said composition a) or b) comprises one or more polyamides which are prepolymers according to a) or which are polymers according to b), which comprise different amide units A and B and optionally amide units C and D, selected as follows:
A: is a predominant amide unit present at a molar content ranging from 55% to 85%, chosen from x.T units, where x is a linear $C_9$ to $C_{18}$ aliphatic diamine and where T is terephthalic acid,
B: is an amide unit different from A, which unit B is present at a molar content ranging from 15% to 45%, depending on the Tm of the polyamide based on unit A, and said amide unit B is chosen from x'.T units, where x' is chosen from:
  B1) a branched aliphatic diamine carrying a single methyl or ethyl branch (or branching) and having a main chain length different by at least two carbon atoms with respect to the main chain length of the diamine x of said associated unit A, or
  B2) m-xylylenediamine (MXD) or
  B3) a linear aliphatic diamine selected from the group consisting of $C_4$, $C_5$, and $C_7$ to $C_{18}$ aliphatic diamines, when, in the unit A, said diamine x is a linear $C_{11}$ to $C_{18}$ aliphatic diamine and x' is a $C_9$ to $C_{18}$ diamine when, in the unit A, said diamine x is a $C_9$ or $C_{10}$ diamine, with the proviso that the unit B3 is chosen from linear $C_4$, $C_5$ and $C_7$ to $C_{18}$ aliphatic diamine when, in said unit A, said diamine x is a linear $C_{12}$ aliphatic diamine,
C: optional amide unit different from A and from B, chosen from amide units based on a cycloaliphatic and/or aromatic structure or based on x'.T as defined for B but with x' different from x' for the unit B,
D: optional amide unit different from A, from B and from C when C is present and chosen from the aliphatic amide units resulting from:
$C_6$ to $C_{12}$ amino acids or lactams or their mixtures,
the reaction of a linear $C_6$ to $C_{18}$ aliphatic diacid and of a linear $C_6$ to $C_{18}$ aliphatic diamine or of their mixtures,
and under the condition that the sum of the molar contents of A+B+C+D is equal to 100%, said composition being devoid of reinforcing fibers.

2. The process of claim 1, wherein said amide unit C is present and in partial replacement of B at a molar content ranging up to 25%, with respect to said unit B.

3. The process of claim 1, wherein said unit D is present and in partial replacement of B at a molar content ranging up to 70%, with respect to said unit B.

4. The process of claim 1, wherein the difference Tm−Tc between the melting point Tm and the crystallization temperature Tc of said matrix thermoplastic polymer does not exceed 50° C., as determined according to the standard 11357-3:2013.

5. The process of claim 1, wherein the enthalpy of crystallization, measured by differential scanning calorimetry (DSC) according to the standard ISO 11357-3:2013, is greater than 40 J/g.

6. The process of claim 1, wherein said amide unit A is present with a molar content ranging from 55% to 80%, with respect to all of the units of said polymer.

7. The process of claim 1, wherein said unit B corresponds to x'.T with x' chosen according to option B1).

8. The process of claim 1, wherein said unit B corresponds to a linear aliphatic diamine according to option B3).

9. The process of claim 1, wherein the units A and B are selected as follows:
  for the unit A which is 9T, said unit B is selected from: 10T, 11T, 12T, 13T, 14T, 15T, 16T, 17T and 18T, MPMD.T and MXD.T, with a molar content of B ranging from 30% to 45%,
  for the unit A which is 10T, said unit B is selected from: 9T, 11T, 12T, 13T, 14T, 15T, 16T, 17T and 18T, MPMD.T and MXD.T, with a molar content of B ranging from 25% to 45%,
  for the unit A which is 11T, said unit B is selected from: 9T, 10T, 12T, 13T, 14T, 15T, 16T, 17T and 18T, MPMD.T and MXD.T, with a molar content of B ranging from 20% to 45%,
  for the unit A which is 12T, said unit B is selected from: 9T, 10T, 11T, 13T, 14T, 15T, 16T, 17T and 18T, MPMD.T and MXD.T, with a molar content of B ranging from 20% to 45%.

10. The process of claim 9, wherein the unit A is a 10T unit and the unit B is selected from: 9T, 11T, 12T, 13T, 14T, 15T, 16T, 17T and 18T, MPMD.T and MXD.T, with a molar content of B ranging from 25% to 45%.

11. The process of claim 7, wherein a portion of the unit B which is up to 70 mol %, with respect to B, is replaced with a unit C and/or D.

12. The process of claim 1, wherein said polyamide composition is a reactive prepolymer composition according to a) and precursor of said polyamide polymer of said matrix of the material.

13. The process of claim 12, wherein said composition a) comprises at least one reactive prepolymer carrying, on the same chain, two end functional groups X' and Y' which are respectively coreactive with one another by condensation, with X' and Y' being amine and carboxyl or carboxyl and amine respectively.

14. The process of claim 12, wherein said reactive composition a) comprises at least two polyamide prepolymers which are reactive with one another and which each respectively carry two identical end functional groups X' or Y', said functional group X' of a prepolymer being able to react only with said functional group Y' of the other prepolymer.

15. A process for the manufacture of a thermoplastic material, in particular of a mechanical part based on said material, wherein the process comprises at least one stage of molding by injection or one stage of processing by extrusion of a polyamide composition for thermoplastic material or thermoplastic material composition, said material comprising a thermoplastic matrix based on at least one thermoplastic polymer, wherein:
  said matrix thermoplastic polymer is a semicrystalline polyamide polymer with a glass transition temperature Tg of at least 90° C. and with a melting point Tm of less than or equal to 280° C., as respectively determined according to the standards ISO 11357-2:2013 and 11357-3:2013,
  said composition comprises:
    a) a reactive composition comprising at least one reactive polyamide prepolymer, said composition being a precursor composition of said polyamide polymer of said matrix,
    or, as an alternative to a),
    b) a nonreactive composition of at least one polyamide polymer, including the polymer resulting from a), said composition being that of said matrix thermoplastic polymer, and said composition a) or b) comprises one or more polyamides which are prepolymers according to a) or which are polymers according to b), which comprise different amide units A and B and optionally amide units C and D, selected as follows:
A: is a predominant amide unit present at a molar content ranging from 55% to 85%, chosen from x'.T units, where x is a linear $C_9$ to $C_{18}$ aliphatic diamine and where T is terephthalic acid,
B: is an amide unit different from A, which unit B is present at a molar content ranging from 15% to 45%, depending on the Tm of the polyamide based on unit A, and said amide unit B is chosen from x'.T units, where x' is chosen from:
  B1) a branched aliphatic diamine carrying a single methyl or ethyl branch (or branching) and having a main chain length different by at least two carbon atoms with respect to the main chain length of the diamine x of said associated unit A, or
  B2) m-xylylenediamine (MXD) or
  B3) a linear $C_4$ to $C_{18}$ aliphatic diamine when, in the unit A, said diamine x is a linear $C_{11}$ to $C_{18}$ aliphatic diamine and x' is a $C_9$ to $C_{18}$ diamine when, in the unit A, said diamine x is a $C_9$ or $C_{10}$ diamine, with the proviso that the unit B3 is chosen from linear $C_4$, $C_5$ and $C_7$ to $C_{18}$ aliphatic diamine when, in said unit A, said diamine x is a linear $C_{12}$ aliphatic diamine,
C: optional amide unit different from A and from B, chosen from amide units based on a cycloaliphatic and/or aromatic structure or based on x'.T as defined for B but with x' different from x' for the unit B,
D: optional amide unit different from A, from B and from C when C is present and chosen from the aliphatic amide units resulting from:
$C_6$ to $C_{12}$ amino acids or lactams or their mixtures,
the reaction of a linear $C_6$ to $C_{18}$ aliphatic diacid and of a linear $C_6$ to $C_{18}$ aliphatic diamine or of their mixtures,
and under the condition that the sum of the molar contents of A+B+C+D is equal to 100%,
said composition being devoid of reinforcing fibers,
wherein said polyamide composition is a reactive prepolymer composition according to a) and precursor of said polyamide polymer of said matrix of the material, and
wherein said composition a) or precursor composition comprises:
  a1) at least one prepolymer of said thermoplastic polyamide polymer, carrying n end reactive functional groups X, chosen from: —$NH_2$, —$CO_2H$ and —OH, with n being from 1 to 3, and
  a2) at least one chain extender Y-A'-Y, with A' being a hydrocarbon biradical of nonpolymeric structure, carrying 2 identical end reactive functional groups Y, which are reactive by polyaddition with at least one functional group X of said prepolymer a1).

16. The process of claim 12, wherein said reactive prepolymers of said composition a) have a number-average molecular weight Mn ranging from 500 to 10,000, as determined by potentiometric titration.

17. A process for the manufacture of a thermoplastic material, in particular of a mechanical part based on said material, wherein the process comprises at least one stage of molding by injection or one stage of processing by extrusion of a polyamide composition for thermoplastic material or thermoplastic material composition, said material comprising a thermoplastic matrix based on at least one thermoplastic polymer, wherein:

said matrix thermoplastic polymer is a semicrystalline polyamide polymer with a glass transition temperature Tg of at least 90° C. and with a melting point Tm of less than or equal to 280° C., as respectively determined according to the standards ISO 11357-2:2013 and 11357-3:2013,
said composition comprises:
  a) a reactive composition comprising at least one reactive polyamide prepolymer, said composition being a precursor composition of said polyamide polymer of said matrix,
  or, as an alternative to a),
  b) a nonreactive composition of at least one polyamide polymer, including the polymer resulting from a), said composition being that of said matrix thermoplastic polymer, and
said composition a) or b) comprises one or more polyamides which are prepolymers according to a) or which are polymers according to b), which comprise different amide units A and B and optionally amide units C and D, selected as follows:
A: is a predominant amide unit present at a molar content ranging from 55% to 85%, chosen from x.T units, where x is a linear $C_9$ to $C_{18}$ aliphatic diamine and where T is terephthalic acid,
B: is an amide unit different from A, which unit B is present at a molar content ranging from 15% to 45%, depending on the Tm of the polyamide based on unit A, and said amide unit B is chosen from x'.T units, where x' is chosen from:
  B1) a branched aliphatic diamine carrying a single methyl or ethyl branch (or branching) and having a main chain length different by at least two carbon atoms with respect to the main chain length of the diamine x of said associated unit A, or
  B2) m-xylylenediamine (MXD) or
  B3) a linear $C_4$ to $C_{18}$ aliphatic diamine when, in the unit A, said diamine x is a linear $C_{11}$ to $C_{18}$ aliphatic diamine and x' is a $C_9$ to $C_{18}$ diamine when, in the unit A, said diamine x is a $C_9$ or $C_{10}$ diamine, with the proviso that the unit B3 is chosen from linear $C_4$, $C_5$ and $C_7$ to $C_{18}$ aliphatic diamine when, in said unit A, said diamine x is a linear $C_{12}$ aliphatic diamine,
C: optional amide unit different from A and from B, chosen from amide units based on a cycloaliphatic and/or aromatic structure or based on x'.T as defined for B but with x' different from x' for the unit B,
D: optional amide unit different from A, from B and from C when C is present and chosen from the aliphatic amide units resulting from:
$C_6$ to $C_{12}$ amino acids or lactams or their mixtures,
the reaction of a linear $C_6$ to $C_{18}$ aliphatic diacid and of a linear $C_6$ to $C_{18}$ aliphatic diamine or of their mixtures,
and under the condition that the sum of the molar contents of A+B+C+D is equal to 100%,
said composition being devoid of reinforcing fibers,
wherein said polyamide composition is a reactive prepolymer composition according to a) and precursor of said polyamide polymer of said matrix of the material, and
wherein X is $NH_2$ or OH, and Y is chosen from an oxazinone and an oxazolinone.

18. A process for the manufacture of a thermoplastic material, in particular of a mechanical part based on said material, wherein the process comprises at least one stage of molding by injection or one stage of processing by extrusion of a polyamide composition for thermoplastic material or thermoplastic material composition, said material comprising a thermoplastic matrix based on at least one thermoplastic polymer, wherein:

said matrix thermoplastic polymer is a semicrystalline polyamide polymer with a glass transition temperature Tg of at least 90° C. and with a melting point Tm of less than or equal to 280° C., as respectively determined according to the standards ISO 11357-2:2013 and 11357-3:2013, said composition comprises:

a) a reactive composition comprising at least one reactive polyamide prepolymer, said composition being a precursor composition of said polyamide polymer of said matrix, or, as an alternative to a), b) a nonreactive composition of at least one polyamide polymer, including the polymer resulting from a), said composition being that of said matrix thermoplastic polymer, and said composition a) or b) comprises one or more polyamides which are prepolymers according to a) or which are polymers according to b), which comprise different amide units A and B and optionally amide units C and D, selected as follows:

A: is a predominant amide unit present at a molar content ranging from 55% to 85%, chosen from x.T units, where x is a linear $C_9$ to $C_{18}$ aliphatic diamine and where T is terephthalic acid, B: is an amide unit different from A, which unit B is present at a molar content ranging from 15% to 45%, depending on the Tm of the polyamide based on unit A, and said amide unit B is chosen from x'.T units, where x' is chosen from:

B1) a branched aliphatic diamine carrying a single methyl or ethyl branch (or branching) and having a main chain length different by at least two carbon atoms with respect to the main chain length of the diamine x of said associated unit A, or B2) m-xylylenediamine (MXD) or B3) a linear $C_4$ to $C_{18}$ aliphatic diamine when, in the unit A, said diamine x is a linear $C_{11}$ to $C_{18}$ aliphatic diamine and x' is a $C_9$ to $C_{18}$ diamine when, in the unit A, said diamine x is a $C_9$ or $C_{10}$ diamine, with the proviso that the unit B3 is chosen from linear $C_4$, $C_5$ and $C_7$ to $C_{18}$ aliphatic diamine when, in said unit A, said diamine x is a linear $C_{12}$ aliphatic diamine, C: optional amide unit different from A and from B, chosen from amide units based on a cycloaliphatic and/or aromatic structure or based on x'.T as defined for B but with x' different from x' for the unit B, D: optional amide unit different from A, from B and from C when C is present and chosen from the aliphatic amide units resulting from:

$C_6$ to $C_{12}$ amino acids or lactams or their mixtures, the reaction of a linear $C_6$ to $C_{18}$ aliphatic diacid and of a linear $C_6$ to $C_{18}$ aliphatic diamine or of their mixtures, and under the condition that the sum of the molar contents of A+B+C+D is equal to 100%, said composition being devoid of reinforcing fibers, wherein said polyamide composition is a reactive prepolymer composition according to a) and precursor of said polyamide polymer of said matrix of the material, and wherein X is $CO_2H$ and Y is chosen from an epoxy and an oxazoline.

19. The process of claim 18, wherein X is $CO_2H$ and Y-A'-Y is chosen from phenylenebisoxazolines.

20. A mechanical part of thermoplastic material, wherein the part results from the use of at least one composition according to claim 1 or from the use of a nonreactive polyamide polymer according to said composition b) or a polymer capable of being obtained from a reactive composition according to said composition a).

21. The part of claim 20, wherein the part concerns mechanical parts for applications in the motor vehicle industry, cooling devices or devices for transporting or transferring fuels or fluids.

22. The part of claim 20, wherein the part concerns mechanical parts for applications in the electrical or electronics industry.

23. The process of claim 1, wherein the reactive composition consists of the at least one reactive polyamide prepolymer.

* * * * *